United States Patent
Liang et al.

(10) Patent No.: US 11,669,943 B2
(45) Date of Patent: Jun. 6, 2023

(54) DUAL-STAGE SYSTEM FOR COMPUTATIONAL PHOTOGRAPHY, AND TECHNIQUE FOR TRAINING SAME

(71) Applicant: Microsoft Technology Licensing, LLC, Redmond, WA (US)

(72) Inventors: Luming Liang, Redmond, WA (US); Ilya Dmitriyevich Zharkov, Sammamish, WA (US); Vivek Pradeep, Redmond, WA (US); Faezeh Amjadi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 17/073,256

(22) Filed: Oct. 16, 2020

(65) Prior Publication Data

US 2022/0122235 A1 Apr. 21, 2022

(51) Int. Cl.
*G06T 5/00* (2006.01)
*G06N 3/08* (2023.01)
(Continued)

(52) U.S. Cl.
CPC ............ *G06T 5/009* (2013.01); *G06N 3/045* (2023.01); *G06N 3/08* (2013.01); *G06T 3/40* (2013.01);
(Continued)

(58) Field of Classification Search
CPC .. G06T 5/009; G06T 3/40; G06T 5/50; G06T 2207/20081; G06T 2207/20084;
(Continued)

(56) References Cited

U.S. PATENT DOCUMENTS 7,447,382 B2   11/2008   Nestares et al.
9,094,648 B2    7/2015   Vranceanu
(Continued)

FOREIGN PATENT DOCUMENTS

CN   106204504 A    12/2016
WO   2020048359 A1   3/2020

OTHER PUBLICATIONS

Lore, K. G., et al., "LLNet: A deep autoencoder approach to natural low-light image enhancement", Pattern Recognition, 61 (2017) pp. 650-662.*

(Continued)

*Primary Examiner* — Xuemei G Chen

(57) ABSTRACT

A computational photography system is described herein including a guidance system and a detail enhancement system. The guidance system uses a first neural network that maps an original image provided by an image sensor to a guidance image, which represents a color-corrected and lighting-corrected version of the original image. A combination unit combines the original image and the guidance image to produce a combined image. A detail-enhancement system then uses a second neural network to map the combined image to a predicted image. The predicted image supplements the guidance provided by the first neural network by sharpening details in the original image. A training system is also described herein for training the first and second neural networks. The training system alternates in the data it feeds the second neural network, first using a guidance image as input to the second neural network, and then using a corresponding ground-truth image.

18 Claims, 8 Drawing Sheets

(51) Int. Cl.
*G06T 3/40* (2006.01)
*G06T 5/50* (2006.01)
*G06N 3/045* (2023.01)

(52) U.S. Cl.
CPC ...... *G06T 5/50* (2013.01); *G06T 2207/20081* (2013.01); *G06T 2207/20084* (2013.01); *G06T 2207/20212* (2013.01)

(58) Field of Classification Search
CPC . G06T 2207/20212; G06T 2207/10024; G06T 2207/20132; G06T 2207/20221; G06T 5/008; G06T 5/003; G06N 3/0454; G06N 3/08; H04N 1/4092
See application file for complete search history.

(56) References Cited

U.S. PATENT DOCUMENTS

| | | | | |
|---|---|---|---|---|
| 10,019,654 | B1* | 7/2018 | Pisoni | G06K 9/6262 |
| 11,055,819 | B1* | 7/2021 | Singh | G06N 3/0454 |
| 2019/0019311 | A1* | 1/2019 | Hu | G06T 7/90 |
| 2019/0208979 | A1* | 7/2019 | Bassa | A47L 11/4038 |
| 2019/0213408 | A1* | 7/2019 | Cali | G06V 30/413 |
| 2019/0341001 | A1* | 11/2019 | Mafoodh | G09G 5/10 |
| 2019/0371018 | A1* | 12/2019 | Ye | G06T 11/006 |
| 2020/0304713 | A1* | 9/2020 | Zhao | H04N 7/152 |
| 2020/0320748 | A1* | 10/2020 | Levinshtein | G06N 3/08 |
| 2021/0065448 | A1* | 3/2021 | Goodrich | H04L 51/42 |
| 2021/0101286 | A1* | 4/2021 | Lee | B25J 9/1605 |
| 2022/0036523 | A1* | 2/2022 | Moran | G06T 5/009 |
| 2022/0076459 | A1* | 3/2022 | Zhang | G06N 3/08 |
| 2022/0180528 | A1* | 6/2022 | Dundar | G06N 20/00 |

OTHER PUBLICATIONS

Brooks, et al., "Unprocessing Images for Learned Raw Denoising," CVF reprint of article in Proceedings of the IEEE/CVF Conference on Computer Vision and Pattern Recognition (CVPR), Jun. 2019, 10 pages.
Cao, et al., "OpenPose: Realtime Multi-Person 2D Pose Estimation using Part Affinity Fields," arXiv:1812.08008v2 [cs.CV], May 30, 2019, 14 pages.
Chen, et al., "Seeing Motion in the Dark," in 2019 IEEE/CVF International Conference on Computer Vision (ICCV), Nov. 2019, 10 pages.
Chen, et al., "Learning to See in the Dark," arXiv:1805.01934v1 [cs.CV], May 4, 2018, 10 pages.
Chen, et la., "Bilateral Guided Upsampling," in ACM Transactions on Graphics, vol. 35, No. 6, Article 203, Nov. 2016, 8 pages.
Gharbi, et al., "Deep Bilateral Learning for Real-Time Image Enhancement," in ACM Transactions on Graphics, vol. 36, No. 4, Article 118, Jul. 2017, 12 pages.
Gu, et al., "Self-Guided Network for Fast Image Denoising," CVF reprint of article in 2019 IEEE/CVF International Conference on Computer Vision (ICCV), Nov. 2019, 10 pages.
Guo, et al., "Toward Convolutional Blind Denoising of Real Photographs," CVR reprint of 2019 IEEE/CVF Conference on Computer Vision and Pattern Recognition (CVPR), Jun. 2019, 11 pages.
Guo, et al., "LIME: Low-Light Image Enhancement via Illumination Map Estimation," in IEEE Transactions on Image Processing, vol. 26, No. 2, Feb. 2017, 12 pages.
Ignatov, et al., "Replacing Mobile Camera ISP with a Single Deep Learning Model," in arXiv:2002.05509v1 [cs.CV], Feb. 13, 2020, 11 pages.
Karras, et al., "Progressive Growing of GANs for Improved Quality, Stability, and Variation," in arXiv:1710.10196v3 [cs.NE], Feb. 26, 2018, 26 pages.
Kinoshita, et al., "Convolutional Neural Networks Considering Local and Global Features for Image Enhancement," arXiv:1905.02899v1 [eess.IV], May 7, 2019, 5 pages.
Lehtinen, et al., "Noise2Noise: Learning Image Restoration without Clean Data," arXiv:1803.04189v3 [cs.CV], Oct. 29, 2018, 12 pages.
Liang, et al., "CameraNet: A Two-Stage Framework for Effective Camera ISP Learning," in arXiv:1908.01481v2 [eess.IV], Aug. 8, 2019, 13 pages.
Liba, et al., "Handheld Mobile Photography in Very Low Light," in ACM Transactions on Graphics, vol. 38, No. 6, Article 164, Nov. 2019, 16 pages.
Lore, et al., "LLNet: A Deep Autoencoder Approach to Natural Low-light Image Enhancement," arXiv:1511.03995v3 [cs.CV], Apr. 15, 2016, 11 pages.
Lv, et al., "MBLLEN: Lowlight Image/Video Enhancement Using CNNs," in British Machine Vision Conference (BMVC), 2018, 13 pages.
Mildenhall, et al., "Denoising with Kernel Prediction Networks," CVF reprint of article in 2018 IEEE/CVF Conference on Computer Vision and Pattern Recognition, 2018, 9 pages.
Newell, et al., "Stacked Hourglass Networks for Human Pose Estimation," arXiv:1603.06937v2 [cs.CV], Jul. 26, 2016, 17 pages.
Ratnasingam, Sivalogeswaran, "Deep Camera: A Fully Convolutional Neural Network for Image Signal Processing," arXiv:1908.09191v1 [eess.IV], Aug. 24, 2019, 11 pages.
Romano, et al., "RAISR: Rapid and Accurate Image Super Resolution," arXiv:1606.01299v3 [cs.CV], Oct. 4, 2016, 31 pages.
Schwartz, et al., "Deep-ISP: Toward Learning an End-to-End Image Processing Pipeline," arXiv:1801.06724v2 [eess.IV], Feb. 3, 2019, 12 pages.
Vaezi, et al., "ImagePairs: Realistic Super Resolution Dataset via Beam Splitter Camera Rig," arXiv:2004.08513v1 [eess.IV], Apr. 18, 2020, 11 pages.
Wang, et al., "A Low-Light Image Enhancement with Attention and Multi-level Feature Fusion," in 2019 IEEE International Conference on Multimedia & Expo Workshops (ICMEW), Jul. 2019, pp. 276-281.
Wang, et al., "Underexposed Photo Enhancement Using Deep Illumination Estimation," in 2019 IEEE/CVF Conference on Computer Vision and Pattern Recognition (CVPR), Jun. 2019, 9 pages.
Wang, et al., "Image Quality Assessment: From Error Visibility to Structural Similarity," in IEEE Transactions on Image Processing, vol. 13, No. 4, Apr. 2004, 14 pages.
Wang, et al., "Recovering Realistic Texture in Image Super-resolution by Deep Spatial Feature Transform," arXiv:1804.02815v1 [cs.CV], Apr. 9, 2018, 10 pages.
Xu, et al., "Learning to Restore Low-Light Images via Decomposition-and-Enhancement," CVF reprint of article in Proceedings of the IEEE/CVF Conference on Computer Vision and Pattern Recognition (CVPR), Jun. 2020, 10 pages.
Zamir, et al., "Learning Digital Camera Pipeline for Extreme Low-Light Imaging," arXiv:1904.05939v1 [cs.CV], Apr. 11, 2019, 10 pages.
Zhang, et al., "Beyond a Gaussian Denoiser: Residual Learning of Deep CNN for Image Denoising," arXiv:1608.03981v1 [cs.CV], Aug. 13, 2016, 13 pages.
Zhang, et al., "FFDNet: Toward a Fast and Flexible Solution for CNN based Image Denoising," arXiv:1710.04026v2 [cs.CV], May 22, 2018, 15 pages.
Xhang, et al., "Dual Illumination Estimation for Robust Exposure Correction," arXiv:1910.13688v1 [cs.CV], Oct. 30, 2019, 10 pages.
Zhang, et al., "Enhancing Underexposed Photos using Perceptually Bidirectional Similarity," arXiv:1907.10992v3 [cs.CV], Jul. 8, 2020, 14 pages.
Zhao, et al., "Loss Functions for Image Restoration With Neural Networks," arXiv:1511.08861v3 [cs.CV], Apr. 20, 2018, 11 pages.
Zhu, et al., "EEMEFN: Low-Light Image Enhancement via Edge-Enhanced Multi-Exposure Fusion Network," in Proceedings of the 34th AAAI Conference on Artificial Intelligence, Feb. 2020, pp. 13106-13113.
Chen, Chen, biography page, available at https://cchen156.github.io/, accessed on Sep. 20, 2020, 3 pages.
He, et al., "Deep Residual Learning for Image Recognition," arXiv:1512.03385v1 [cs.CV], Dec. 10, 2015, 12 pages.

(56) References Cited

OTHER PUBLICATIONS

Ronneberger, et al., "U-Net: Convolutional Networks for Biomedical Image Segmentation," arXiv:1505.04597v1 [cs.CV], May 18, 2015, 8 pages.

Zhang, et al., "Attention-Based Network for Low-Light Image Enhancement," arXiv:2005.09829v1 [eess.IV], May 20, 2020, 6 pages.

Bhavani, et al., "LIME: Low-Light Image Enhancement Via Illumination Map Estimation," in International Journal of Scientific Research in Science and Technology (IJSRST), vol. 4, No. 2, 2018, pp. 213-218.

Guan, et al., "NODE: Extreme Low Light Raw Image Denoising using a Noise Decomposition," arXiv:1909.05249v1 [eess.IV], Sep. 11, 2019, 10 pages.

Shi, et al., "Nighttime Low Illumination Image Enhancement with Single Image Using Bright/Dark Channel Prior," in EURASIP Journal on Image and Video Processing, Article No. 13, 2018, 15 pages.

Ren, et al., "Low-Light Image Enhancement via a Deep Hybrid Network," in IEEE Transactions on Image Processing, vol. 28, No. 9, Sep. 2019, pp. 4364-4375.

Liang, et al., "Deep Bilateral Retinex for Low-Light Image Enhancement," arXiv:2007.02018v1 [eess.IV], Jul. 4, 2020, 15 pages.

Wang, et al., "Multiscale Structural Similarity for Image Quality Assessment," in Proceedings of the Thirty-Seventh Asilomar Conference on Signals, Systems and Computers, 2004, 5 pages.

Ding, et al., "Underwater image dehaze using scene depth estimation with adaptive color correction," in OCEANS 2017—Aberdeen, 2017, 5 pages.

Ancuti, et al., "Enhancing Underwater Images and Videos by Fusion," in CVPR '12: Proceedings of the 2012 IEEE Conference on Computer Vision and Pattern Recognition (CVPR), Jun. 2012, pp. 81-88.

PCT Search Report and Written Opinion for PCT/US2021/042309, dated Oct. 21, 2021, 10 pages.

Liang, et al., "Guidance Network With Staged beaming for Image Enhancement," in Proceedings of the IEEE/CVF Conference on Computer Vision and Pattern Recognition (CVPR) Workshops, Jun. 2021, 10 pages.

Joze, et al., "Imagepairs: Realistic Super Resolution Dataset via Beam Splitter Camera Rig," in 2020 IEEE/CVF Conference on Computer Vision and Pattern Recognition Workshops (CVPRW), Jun. 2020, 11 pages.

Buades, et al., "A non-local algorithm for image denoising," in 2005 IEEE Computer Society Conference on Computer Vision and Pattern Recognition (CVPR'05), vol. 2, 2005, 6 pages.

Drew, et al., "The Zeta-Image, Illuminant Estimation, and Specularity Manipulation," Preprint of paper published in Computer Vision and Image Understanding, 2014, vol. 127, 35 pages.

Joze, et al., "Exemplar-Based Color Constancy and Multiple Illumination," in IEEE Transactions on Pattern Analysis and Machine Intelligence, 36(5), 2013, 14 pages.

Li, et al., "Image Demosaicing: A Systematic Survey," in Visual Communications and Image Processing 2008, vol. 3822, International Society for Optics and Photonics, 2008, 15 pages.

* cited by examiner

OVERVIEW OF INFERENCE-STAGE PROCESSING 502

MAP AN ORIGINAL IMAGE PROVIDED BY AN IMAGE SENSOR TO A GUIDANCE IMAGE, THE GUIDANCE IMAGE REPRESENTING A COLOR-CORRECTED AND LIGHTING-CORRECTED COUNTERPART OF THE ORIGINAL IMAGE.
504

COMBINE THE ORIGINAL IMAGE AND THE GUIDANCE IMAGE TO PRODUCE A COMBINED IMAGE.
506

MAP THE COMBINED IMAGE TO A PREDICTED IMAGE, THE PREDICTED IMAGE REPRESENTING A DETAIL-CORRECTED, COLOR-CORRECTED, AND LIGHTING-CORRECTED COUNTERPART OF THE ORIGINAL IMAGE.
508

FIG. 5

DUAL-STAGE SYSTEM FOR COMPUTATIONAL PHOTOGRAPHY, AND TECHNIQUE FOR TRAINING SAME

BACKGROUND

Computational Photography refers to a range of computer-implemented techniques for modifying image data provided by an image sensor. For instance, some computational photography mechanisms aim to replace or supplement the operations traditionally performed by a camera device's Image Signal Processor (ISP). Other mechanisms perform more dedicated tasks, such as de-blurring an original image captured by the image sensor, correcting the color of the original image, increasing the amount of light exhibited by the original image, and so on. Many solutions in this field rely on handcrafted signal processing algorithms that are created and tuned by experts. These solutions, however, are difficult to produce and maintain, and may offer uneven performance. These solutions may also lack versatility because they are narrowly developed to work in particular image capture environments.

SUMMARY

A dual-stage computational photography system is described herein that includes a guidance system and a detail enhancement system. The guidance system uses a first neural network to map an original image provided by an image sensor to a guidance image. The guidance image represents a low-resolution color-corrected and lighting-corrected counterpart of the original image. A combination unit combines the original image and the guidance image, to produce a combined image. The detail-enhancement system then uses a second neural network to map the combined image to a predicted image. The predicted image represents a detail-corrected counterpart of the original image. The predicted image also incorporates the color and lighting corrections specified by the guidance image.

A training system is also described herein for training the first and second neural networks used by the guidance system and the detail-enhancement system, respectively. The training system performs a training process that alternates between the use of a guidance image and a ground-truth image in producing predicted images, and uses information collected by this process to calculate loss.

As will be set forth herein in greater detail, the computational photography system produces high-quality predicted images. It also uses a smaller number of features compared to other solutions. The training system likewise makes efficient uses of computational resources (such as memory) by performing training on patches of image information.

The above-summarized technology can more generally be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flowchart that shows one illustrative manner of operation of the CP system of FIG. 1 in an inference-stage of use.

Figure 1:
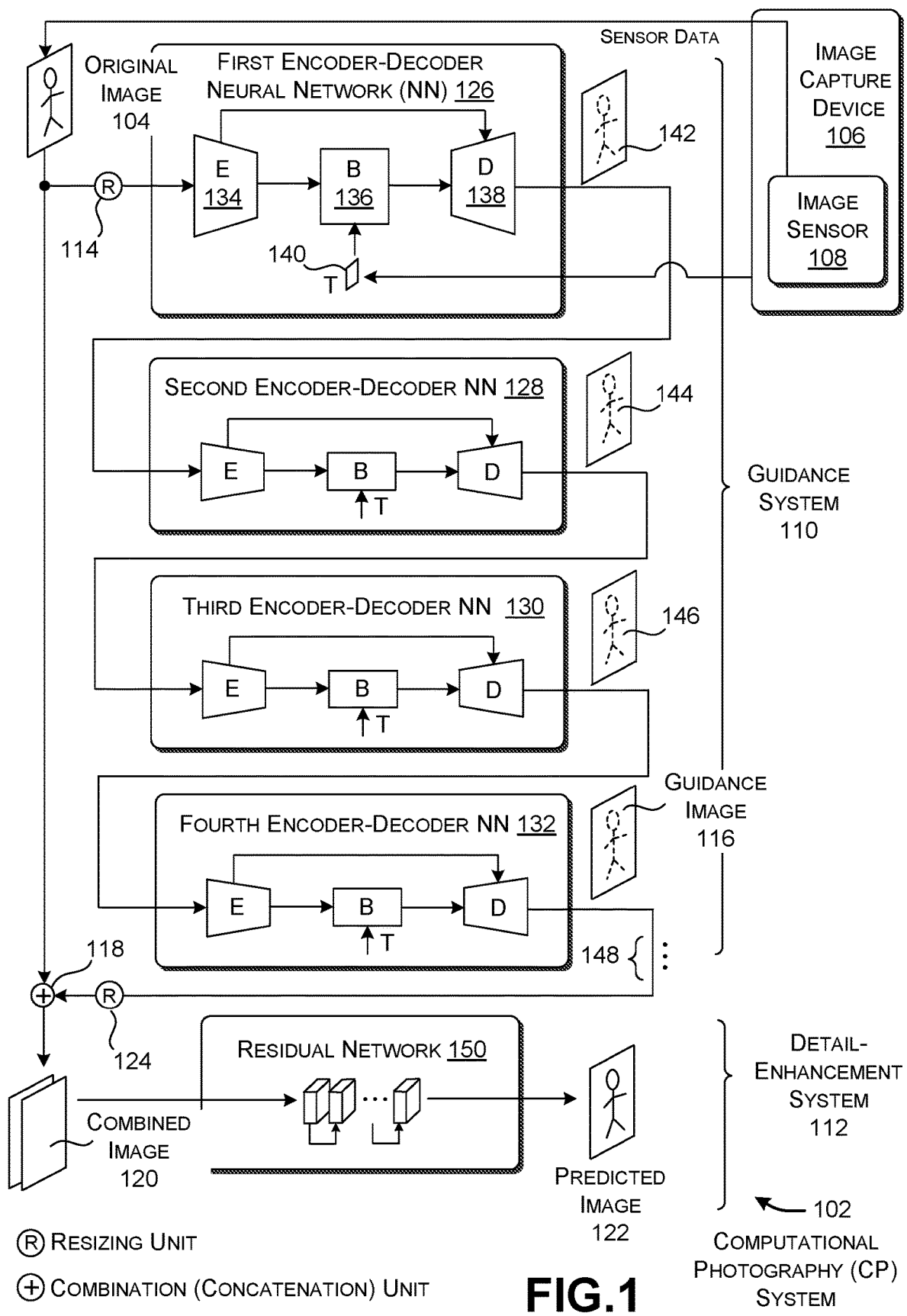
FIG. 1 shows an illustrative computational photography (CP) system for modifying an original image captured by an image sensor.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes systems for processing images. Section B sets forth illustrative methods which explain the operation of the systems of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "module," "engine," "system," and "tool" refers to a part of the hardware logic circuitry that performs a particular function or combination of functions.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further still, the descriptors "first," "second," "third," etc. are used to distinguish among different items, and do not imply an ordering among items, unless otherwise noted. Finally, the terms "exemplary" or "illustrative" refer to one implementation among potentially many implementations.

A. Illustrative Computing Systems

FIG. 1 shows a computational photography (CP) system 102 for processing images. In one application, the CP system 102 processes an original image 104 provided by an image capture device 106, e.g., corresponding to a camera of any type(s). The image capture device 106, in turn, captures the original image 104 using an image sensor 108, such as a Charge Coupled Device (CCD). The CP system 102 modifies the original image 104 to produce a modified version thereof.

In one implementation, the CP system 102 replaces or supplements the Image Signal Processor (ISP) of the image capture device 106, which traditionally has performed image processing in a series of stages, e.g., including stages devoted to defect pixel removal, de-noising, de-mosaicing, gamma correction, white balancing, etc. In other implementations, the CP system 102 provides a color-corrected and/or lighting/corrected version of the original image 104. That is, the CP system 102 can improve the accuracy and expressiveness of colors in the original image 104, and/or increases the brightness of the original image 104. Alternatively, or in addition, the CP system 102 removes noise from the original image 104. These implementations are mentioned in the spirit of illustration, not limitation; still other applications of the CP system 102 are possible.

In some implementations, the original image 104 represents the raw data generated by the image sensor 108. For example, assume that the image sensor 108 includes sensing elements having different filters for respectively collecting red, green, and blue sensor readings. Further assume that the image sensor 108 arranges these sensing elements in a Bayer pattern. In this context, the original image 104 represents the sensor data captured by the sensing elements at a particular capture time. This is merely one example. More generally, the CP system 102 processes sensor data produced by a sensor that uses any type of color pattern which includes any set of color types (not limited to red, green, and blue).

The CP system 102 can optionally perform one or more preprocessing operations on the raw sensor data provided by the image sensor 108 to produce the original image 104. For example, the CP system 102 can multiply the elements in the sensor image by the exposure time. The exposure time describes the amount of time that the image sensor 108 was illuminated to capture the sensor data. In addition, or alternatively, the CP system 102 can package the sensor data produced by the image sensor 108 in a particular manner. For instance, the CP system 102 can package the red data items (e.g., red pixel values) in the sensor image into a red channel, the green data items into a green channel, and the blue data items into a blue channel.

The CP system 102 uses a machine-trained model. This description will first explain the CP system 102 with reference to FIGS. 1-3 in the context of its use at inference time, after its model has been trained. This description will then explain the CP system 102 in the context of its operation at training time, that is, during training of its model. FIG. 4 shows a training system that performs this task.

From a high-level perspective, the CP system 102 includes two sub-systems operating in a staged manner: a guidance system 110 and a detail-enhancement system 112. The guidance system 110 uses a resizing unit ("R") 114 to transform the original image 104 into a predetermined size, such as a 512×512 image. The resizing unit 114 can resize an image using any technique, such as nearest neighbor interpolation, linear resizing, bi-cubic resizing, etc. The guidance system 110 then maps the resized original image (referred to as the original image 104 for brevity) to a guidance image 116. The guidance image 116 represents a low-resolution color-corrected and lighting-corrected version of the original image 104.

A combination unit ("+") 118 combines (e.g., concatenates) the guidance image 116 with the original image 104, to produce a combined image 120. The combination unit 118 can be interpreted as part of the guidance system 110, the detail-enhancement system 112, or as a separate component, apart from the guidance system 110 and the detail-enhancement system 112.

The detail-enhancement system 112 then maps the combined image 120 to a predicted image 122. The detail-enhancement system 112 performs this task by sharpening details in the original image 104, as guided by color and lighting-related insights in the guidance image 116, and the high-frequency information expressed by the original image 104. Altogether, the predicted image 122 represents a detail-corrected, color-corrected, and lighting-corrected version of the original image 104.

In one implementation, at the time of inference, the combined image 120 that the detail-enhancement system 112 operates on optionally represents a full-size version of the original image 104. To achieve this result, a second resizing unit 124 can resize the guidance image 116 to the same size as the full-size original image 104. To simplify explanation, the guidance system 110 and the detail-enhancement system 112 will be said to operate on the original image 104; it should be kept in mind, however, that these two systems (110, 112) may operate on two different versions of the original image 104 having different respective sizes (resolutions).

In one implementation, the guidance system 110 includes plural component encoder-decoder neural networks (126, 128, 130, 132) connected in series. The encoder-decoder neural networks (126, 128, 130, 132) are connected in series in the sense that the output of the first encoder-decoder neural network 126 serves as the input to the second encoder-decoder neural network 128, the output of the second encoder-decoder network 128 serves as the input to the third encoder-decoder neural network 130, and the output of the third encoder-decoder neural network 130 serves as input to the fourth encoder-decoder neural network 132.

FIG. 1 illustrates the composition of the first encoder-decoder neural network 126 in detail. The other encoder-decoder neural networks (128, 130, 132) share the same composition as the encoder-decoder neural network 126. The encoder-decoder neural network 126 includes an encoder 134, a bottleneck system 136, and a decoder 138. The encoder 134 maps an encoder input image (here, the resized original image 104) to an encoder output image. The bottleneck system 136 concatenates the encoder output image with a set of properties provided by the image capture device 106 that describe the conditions under which the original image 104 was captured. This yields a property-supplemented encoder image. The set of properties can include any of: the exposure time; the digital gain of the image capture device 106 at capture time; the analog gain of the image capture device 106 at capture time; one or more parameter values that describe a lens setting of the image capture device 106 at capture time, and so on. The CP system 102 can replicate the set of properties over an array 140 having the same dimensions (width and height) as the encoder output image. The bottleneck system 136 then maps the property-supplemented encoder output image to a bottleneck output image. Finally, the decoder 138 maps the bottleneck output image to a decoder output image 142. Additional information regarding one implementation of the encoder-decoder neural network 126 will be set forth below in the context of the explanation of FIG. 2.

Similarly, the second encoder-decoder neural network 128 produces a decoder output image 144, the third encoder-decoder neural network 130 produces a decoder output image 146, and the fourth encoder-decoder neural network 132 produces a decoder output image that serves as final guidance image 116 of the guidance system 110. Note that the other implementations can vary the architecture of the guidance system 110 in different ways, such as by using a single monolithic neural network instead of plural neural networks in series. Alternatively, or in addition, another implementation can vary the architecture of each component neural network, compared to the encoder-decoder design described above. Alternatively, or in addition, another implementation can include more or fewer number of encoder-decoder neural networks, a point represented in FIG. 1 by the ellipses 148.

The image quality can be expected to improve along the pipeline of encoder-decoder neural networks (126, 128, 130, 132). For instance, the second decoder output image 144 may exhibit improved color and/or lighting quality compared to the first decoder output image 142, the third decoder output image 146 may exhibit improved color and/or lighting quality compared to the second decoder output image 144, and so on.

In one implementation, the detail-enhancement system 112 includes a single residual network 150, also known in the art as a ResNet. As will be explained in detail below in connection with FIG. 3, the residual network 150 is composed of a plurality of processing blocks. Each processing blocks includes a residual connection.

In one non-limiting implementation, the architecture of the CP system 102 may be characterized as a fully convolutional network (FCN). A fully convolutional network is a convolutional neural network that omits the fully-connected neural network found in traditional convolutional neural networks, e.g., by replacing it with one or more additional convolutional layers. The use of an FCN architecture is advantageous because it can be used to process input images having arbitrary dimensions.

Overall, the CP system 102 makes use of fewer features in processing image information compared to other solutions. The CP system 102 achieves this result, in part, by breaking its analysis task into two stages, the first of which involves processing a lower-resolution version of the original image 104. That is, the guidance system 110 reduces the number of features that it generates by processing a reduced-size version of the original image 104.

At the same time, the CP system provides good quality results. Quality can be assessed in any environment-specific manner by comparing each predicted image to a corresponding ground-truth image using any similarity metric(s), e.g., Peak Signal to Noise Ratio (PSNR), structural similarity (SSIM), etc. The good results stem from multiple factors, including, but not limited to: the separation of the image-processing task into two subtasks, the first subtask devoted to correcting the color and lighting of the original image 104, and the second subtask devoted to sharpening the details in the original image 104; the use of a multi-stage architecture in the guidance system 110 for correcting color and lighting in the original image 104; the combination of the original image 104 and the guidance image 116, and then feeding this combination into the detail-enhancement system 112, etc. As to the last-mentioned factor, feeding the combination of the original image 104 and the guidance image 116 into the detail-enhancement system 112 enables the detail-enhancement system 112 to successfully sharpen details in the original image 104 while improving the color and/or lighting in the original image 104.

Figure 2:
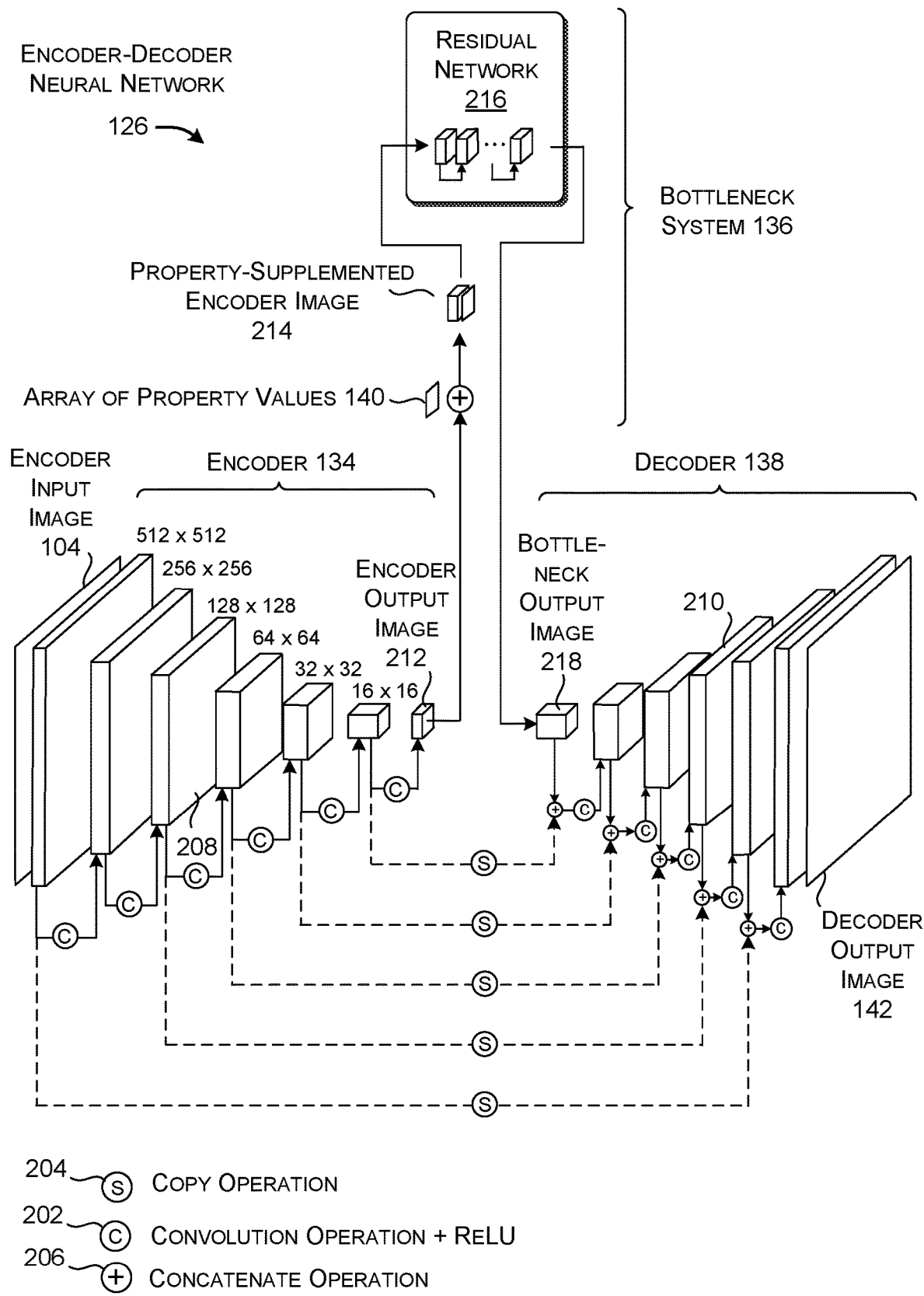
FIG. 2 shows illustrative details of an encoder-decoder neural network that can be used by the CP system of FIG. 1.

FIG. 2 shows further illustrative details regarding the encoder-decoder neural network 126, which corresponds to the first of the fourth encoder-decoder neural networks described above. To repeat, the encoder-decoder neural network 126 includes an encoder 134, bottleneck system 136, and decoder 138, connected in series. While the following explanation is framed in the context of the encoder-decoder neural network 126, it applies to the other encoder-decoder neural networks (128, 130, 132) with equal force.

Assume that the resizing unit 114 (of FIG. 1) provides a version of the original image 104 of size 512×512. The encoder 134 applies a series of convolutional operations to produce image data of increasingly smaller dimensions (defined by the height h and width w of a block of image data), e.g., by successively converting a 512×512 block of image data to a 256×256 block of image data, converting the 256×256 block of image data to a 128×128 block of image data, etc. The depth d of each block represents a number of slices or channels in the block. The decoder 138 performs a series of convolutional operations to produce image data of increasingly larger dimensions.

More specifically, each operation labeled as "C" 202 in FIG. 2 represents a convolutional unit followed by a rectifier linear unit (ReLU). A convolutional unit applies one or more convolutional kernels across a block of input data, to produce one or more output feature maps. That is, at each position of a kernel, the convolutional unit multiplies a subset of values in the block of input data by machine-learned values specified by a kernel, to provide an output value in an output feature map. In one implementation, each convolutional operation performed by the encoder 134 reduces each of the height and width of a block of input data by a factor of 2, e.g., by using a stride of 2 in advancing the kernel through the block of input data. The same applies to the decoder 138, but in reverse. This manner of operation eliminates the need for separate pooling layers and up-sampling layers in the encoder 134 and decoder 138, respectively.

Each unit labeled as "S" 204 in FIG. 2 performs a copy operation, and each united labeled as "+" 206 represents a concatenation operation. Each copy unit works in conjunction with a concatenation unit to copy a block of image data from a particular stage of the encoder 134 and combine it with a block of image data at a corresponding stage of the decoder 138. For example, the encoder-decoder neural network 126 copies a block of image data 208 from the encoder 134 and concatenates it with a corresponding block of image data 210 from the decoder 138, where the blocks of image data (208, 210) have the same dimensions. This transfer of information from encoder 134 to decoder 138 improves the ability of the encoder-decoder neural network 126 to properly modify the color and lighting characteristics of the encoder input image 104, e.g., by preserving information that would otherwise be lost in the encoder's compression of the encoder input image.

As previously described, the bottleneck system 136 begins by concatenating an array 140 of property values with an encoder output image 212, to produce a property-supplemented encoder image 214. It is desirable to integrate the property values into the image correction process because the property values have a bearing on the appropriate amount of correction to be applied by the CP system 102. For instance, the amount of noise in the original image 104 may increase as the exposure time decreases and as the digital gain decreases, etc. A residual network 216 then maps the property-supplemented encoder image 214 to a bottleneck output image 218. The decoder 138 then maps the bottleneck output image 218 to the decoder output image 142.

The details of the encoder-decoder neural network 126 are set forth above in the spirit of illustration, not limitation. Other implementations can vary the design of the encoder-decoder neural network 126 in one or more respects. For example, the encoder 134 and the decoder 138 do not use separate pooling layers or up-sampling layers, relying on the convolution operation itself to perform these functions. However, other implementations can use separate pooling layers and/or up-sampling layers. Alternatively, or in addition, other implementations can add one or more fully-connected layers and/or other types of processing operations to the encoder-decoder neural network 126.

Figure 3:
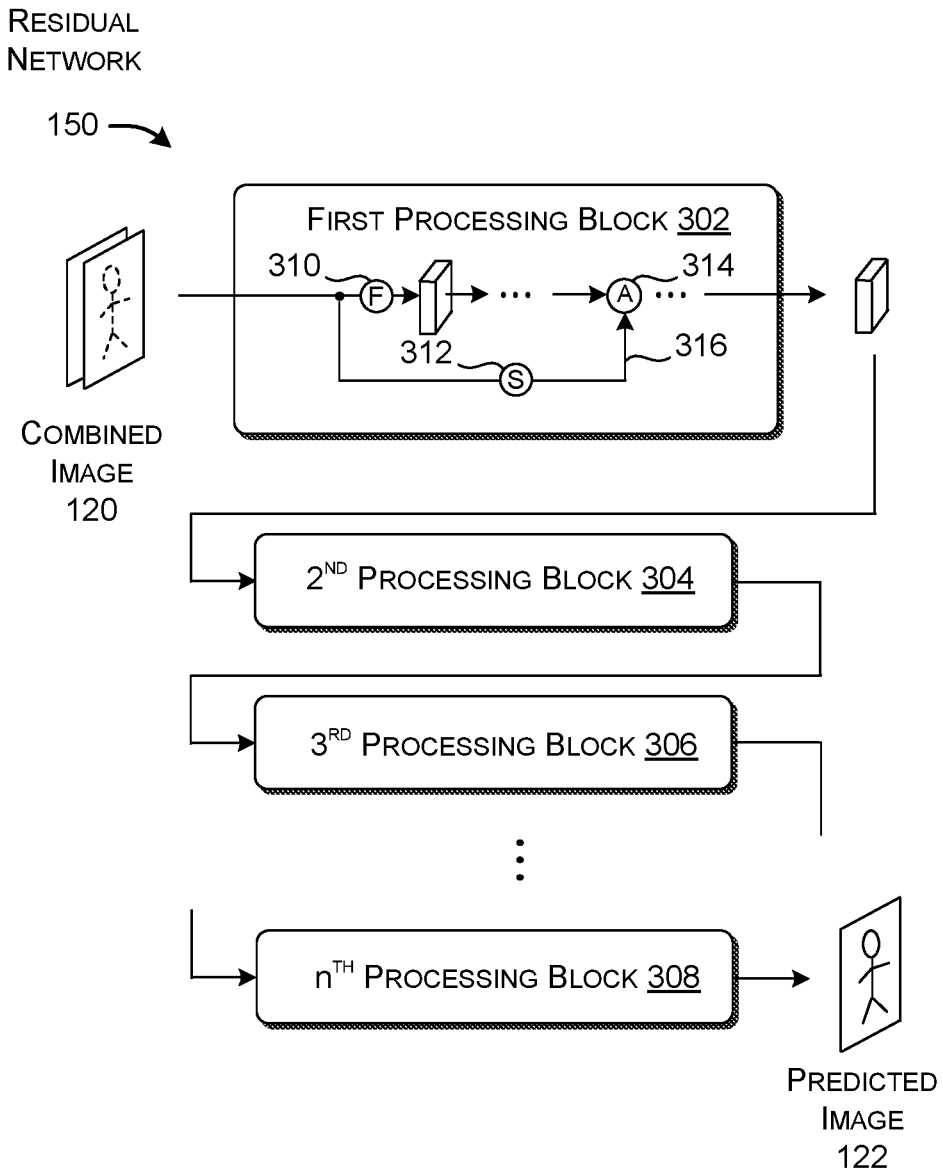
FIG. 3 shows illustrative details of a residual network that can be used by the CP system of FIG. 1.
Figure 4:
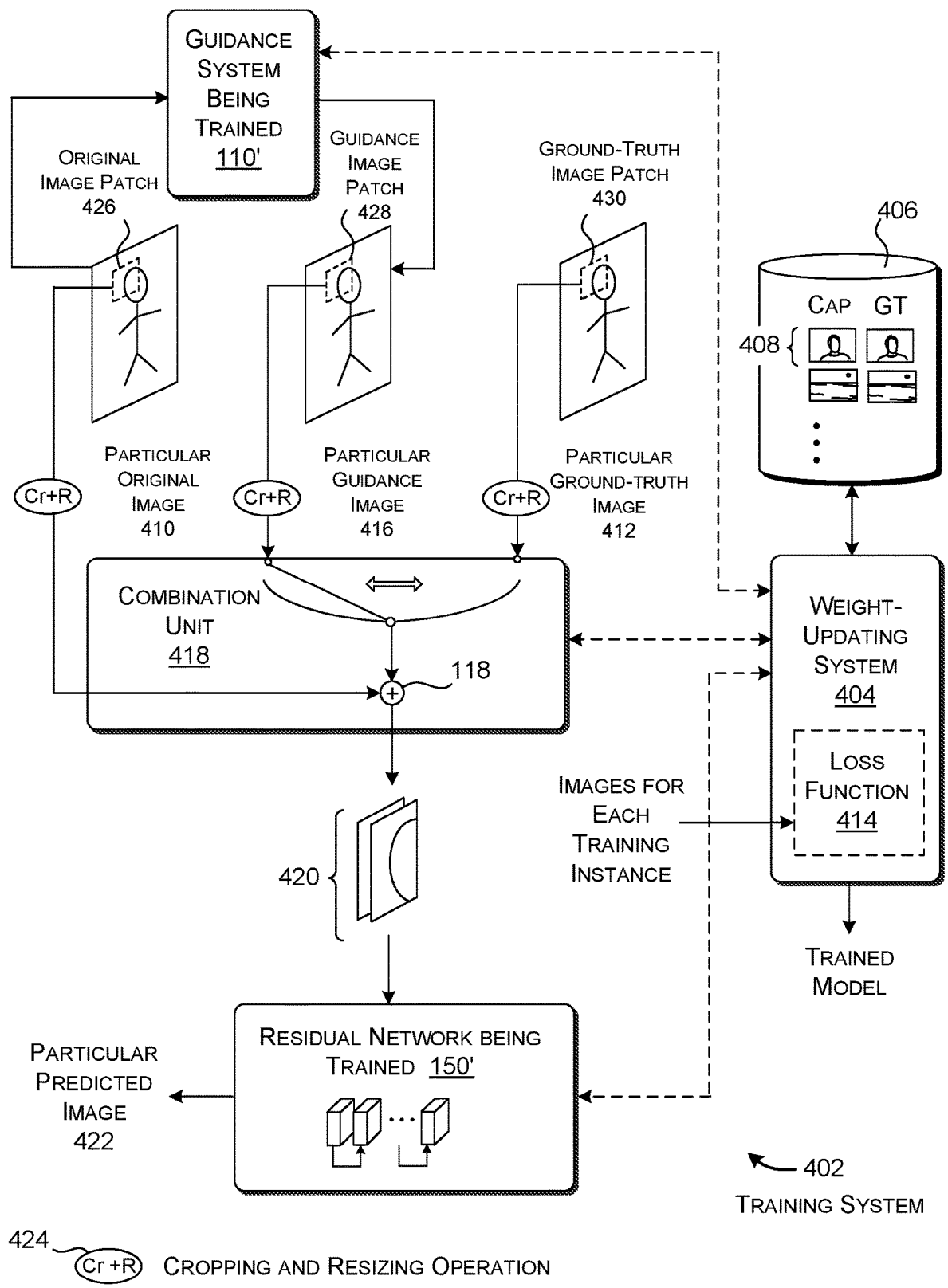
FIG. 4 shows illustrative details of a training system that can be used to train neural networks used by the CP system of FIG. 1.

FIG. 3 shows one implementation of the residual network 150 provided by the detail-enhancement system 112. This explanation also applies to the composition and operation of the residual network 216 used by the bottleneck system 136 of FIG. 2. In its inference-stage operation, the residual network 150 operates on the combined image 120, which, in turn, represents the concatenation of the original image 104 and the guidance image 116. More specifically, in one non-limiting implementation, the residual network 150 operates on a version of the original image 104 that has a higher resolution compared to the version of the original image 104 that is fed to the guidance system 110. For example, the residual network 150 can operate on an full-size version of the original image 104.

The residual network 150 is composed of a plurality of processing blocks (302, 304, 306, . . . , 308) connected in series, which form a pipeline of processing blocks. The following explanation sets forth illustrative details regarding the first processing block 302. These details apply with equal force to the other processing blocks (304, 306, . . . , 308). The symbol "F" 310 generally represents one or more units that perform one or more operations of any type(s). For instance, in one case, the symbol F represents one or more concatenation units followed by a ReLU unit. The symbol "S" 312 represents a copy unit that performs a copy operation. The symbol "A" 314 represents an addition unit that performs an addition operation. Altogether, FIG. 3 shows that a residual connection 316 entails copying image data that is input to the unit(s) F 310 and adding the copied image data to output image data that is output by the unit(s) F 310.

Although not shown, the CP system 102 can include one or more units that map a multi-channel block of image data into an output image. For example, a transformation unit (not shown) can map a block of image data produced by the last stage of the residual network 150 to the final predicted image 122.

FIG. 4 shows one implementation of a training system 402 that can be used to train the neural networks used by the guidance system 110 and the residual network 150 of the detail-enhancement system 112. FIG. 4 assigns the reference number 110' to the guidance system, indicating that this component is a training-phase counterpart of the trained guidance system 110 shown in FIG. 1. FIG. 4 assigns the reference number 150' to the residual network, indicating that this component is the training-phase counterpart of the trained residual network 150 shown in FIG. 1.

The training system 402 includes a weight-updating system 404 for iteratively modifying weight values. The weight values collectively constitute a model that implements the guidance system 110' and the residual network 150'. The weight-updating system 404 operates on images in a data store 406 of images. The images include a plurality of pairs of images that constitutes respective training instances. For example, a representative training instance 408 includes a particular original image 410 captured by any image capture device, and a particular ground-truth image 412. The ground-truth image 412 represents an accepted transformation of the original image 410. An accepted transformation is one that produces a transformation of color and lighting in the original image 410 that is considered acceptable with respect to any environment-specific standard of acceptability, while preserving, and optionally sharpening, details in the original image 410 with respect to any environment-specific standard of acceptability. In one implementation, one or more human reviewers judge whether a ground-truth image is considered an acceptable transformation of an original image. Alternatively, or in addition, an automated evaluation algorithm may determine whether a ground-truth image is considered an acceptable transformation of an original image, e.g., based on any metric(s) of image similarity, examples of which are described herein. Alternatively, or in addition, an automated transformation algorithm may produce an original image by degrading the quality of what is considered a ground-truth image, e.g., by darkening the ground-truth image and/or modifying its colors.

At each iteration of training, the weight-updating system 404 computes a loss given by a loss function 414. The weight-updating system 404 then uses the loss to update the weight values. The loss has three loss components. A first loss component describes the loss associated with the guidance system 110'. The second loss component and third loss component describe the loss associated with the residual network 150' for two different respective input conditions.

More specifically, in processing the particular training instance 408, the training system 402 first inputs the particular original image 410 to the guidance system 110'. The guidance system 110' maps the original image 410 into a particular guidance image 416 in the manner described above. A combination unit 418 then generates a combination image 420 for input into the residual network 150'. The combination unit 418 can be considered as part of the detail-enhancement system 112. But as explained above, this interpretation reflects an arbitrary grouping of functions and is not intended to suggest that the combination unit 418 is necessarily implemented by a same physical component as the residual network 150'.

More specifically, for a first input condition, the combination unit 418 combines at least a portion of the guidance image 416 with a corresponding portion of the original image 410, to produce a particular combined image 420. That is, the portions are said to correspond because they are positionally aligned, e.g., by demarcating a same portion of a scene in their respective images. FIG. 4 shows the merely illustrative case in which the portion of the scene is a portion of a person's face. The training system 420 then feeds the combined image 420 to the residual network 150'. The residual network 150' maps the combined image 420 to a particular predicted image 422.

To perform the above task, the combination unit 418 invokes a cropping-and-resizing operation ("Cr+R") 424 to randomly select an image patch 428 from the guidance image 416, which is referred to below as a guidance image patch 428. It then resizes the guidance image patch 428 to a predetermined image size expected by the residual network 150' (such as 128×128). Similarly, the combination unit 418 performs the cropping-and-resizing operation 424 to select a corresponding image patch 426 from the original image 410, referred to below as the original image patch 426. The combination unit 418 then resizes the original image patch 426 to the same size as the guidance image patch 428, and concatenates it with the guidance image patch 428, per a concatenation operation ("+"). This order of selection can be reversed, e.g., by first selecting a patch in the original image 410 and then selecting a positionally-matching patch in the guidance image 416.

For a second input condition, the combination unit 418 performs the same operation described above, but instead of combining the original image patch 426 with the guidance image patch 428, it combines the original image patch 426 with an image patch 430 selected from the corresponding ground-truth image 412, which is referred to below as the ground-truth image patch 430. This produces another combined image, which it passes to the residual network 150', which, in turn, produces another particular predicted image.

Overall, the training system 402 can perform the above operation for several patches selected from the original image 410, and corresponding patches from the guidance image 416 and the ground-truth image 412. Thus, a single training instance 408 retrieved from the data store 406 can be expanded into a set of component training instances. This manner of training is advantageous because it reduces the amount of memory and other computing resources that are required to process an individual training instance at any given time. But other implementations can vary the above-described manner of operation in any way. For example, another implementation can perform training using the full versions of the original image, the guidance image 416, and the ground-truth image 412. Note that, in the inference stage, the detail-enhancement system 112 can operate based on a full version of an original image and a counterpart guidance image, not portions of these images. In other words, the training weights learned by operating on portions of images in the training stage are applicable to processing full images in the inference stage.

The training system 402 can produce an accurate model by virtue of the manner in which it alternates between the use of the guidance image 416 and the ground-truth image 412. This is because the training system 402 forces its model to duplicate the content in both the guidance image 416 and the ground-truth image 412. Both the guidance image 416 and the ground-truth image 412 provide insight as to what is a considered desirable color and lighting characteristics of the original image 410. The ground-truth image 412 also provides information regarding what is considered a desirable reproduction and enhancement of details in the original image 410.

As a result of the above-described processing operation performed on the training instance 408, the training system 402 produces a set of images for input into the loss function. These images include: the ground-truth image 412 as a whole, denoted by $I_{gt}$; the guidance image $G_i$ produced by each encoder-decoder neural network i; the ground-truth image patch 430 $P_{gt}$; the guidance image patch 428 $P_{gd}$; the predicted image 422 for the case in which the original image patch 426 is combined with the guidance image patch 428, denoted by $M_{gd}$; and the predicted image for the case in which the original image patch 426 is combined with the ground-truth image patch 430, denoted by $M_{gt}$.

More specifically, the loss function associated with each individual encoder-decoder neural network i can be given by:

$$L_i(G_i, I_{gt}) = \|G_i - I_{gt}\| + 0.5 \times (1 - \text{MSSSIM}(G_i, I_{gt})) \quad (1).$$

The first part of Equation (1) specifies the L1 (Euclidean) distance between the guidance image $G_i$ produced by the encoder-decoder neural network i and the ground-truth image $I_{gt}$ (which is resized to the size of $G_i$). The L1 distance reflects the summation of differences between corresponding elements in the guidance image $G_1$ and the ground-truth image $I_{gt}$. The second part of Equation (1) specifies the structural similarity between the guidance image $G_i$ and the ground-truth image $I_{gt}$. Structural similarity refers to a measure of relatedness between two images, and is described, for instance, in Wang, et al., "Multi-Scale Structural Similarity for Image Quality Assessment," in Proceedings of the 37th IEEE Asilomar Conference on Signals, Systems and Computers, 2003, pp. 1398-1402. More specifically, single-scale structural similarity provides a measure of the luminance-related differences, contrast-related differences, and structural-related differences between two images. The training system 402 produces these differences, in turn, based on statistical information extracted from the two images and the relationships between the two images (e.g., mean, variance, and co-variance). Multi-scale structural similarity combines structural similarity information produced at different image scales. The training system 402 can produce different scales by down-sampling the two images.

The overall loss $L_{gd}$ for all of the encoder-decoder neural networks (126, 128, 130, 132) is the sum of the losses for its individual encoder-decoder neural networks. That is:

$$L_{gd} = \sum_i L_i. \qquad (2)$$

The loss function $L_{rs}$ for the residual network 150' depends on the image information collected for the above-described two input conditions. In one implementation, that loss function is given by:

$$L_{rs} = \|M_{gd} - P_{gd}\| + 0.5 \times (1 - \text{MSSSIM}(M_{gd}, P_{gd})) + \|M_{gt} - P_{gt}\| + 0.5 \times (1 - \text{MSSSIM}(M_{gt}, P_{gt})) \qquad (3).$$

The first line of Equation (3) describes the loss for the first input condition, when the combination unit 418 combines the original image patch 426 with the guidance image patch $P_{gd}$ 428, and when the residual network 150' produces a predicted image $M_{gd}$. The second line of Equation (3) describes the loss for the second input condition, when the combination unit 418 combines the original image patch 426 with the ground-truth image patch $P_{gt}$ 430, and when the residual network 150' produces the predicted image $M_{gt}$.

The overall loss function L that is used to modify the weight values is a sum of the loss functions for the encoder-decoder neural networks (126, 128, 130, 132) and the residual network 150. That is, $L = L_{gd} + L_{rs}$.

B. Illustrative Processes

Figure 6:
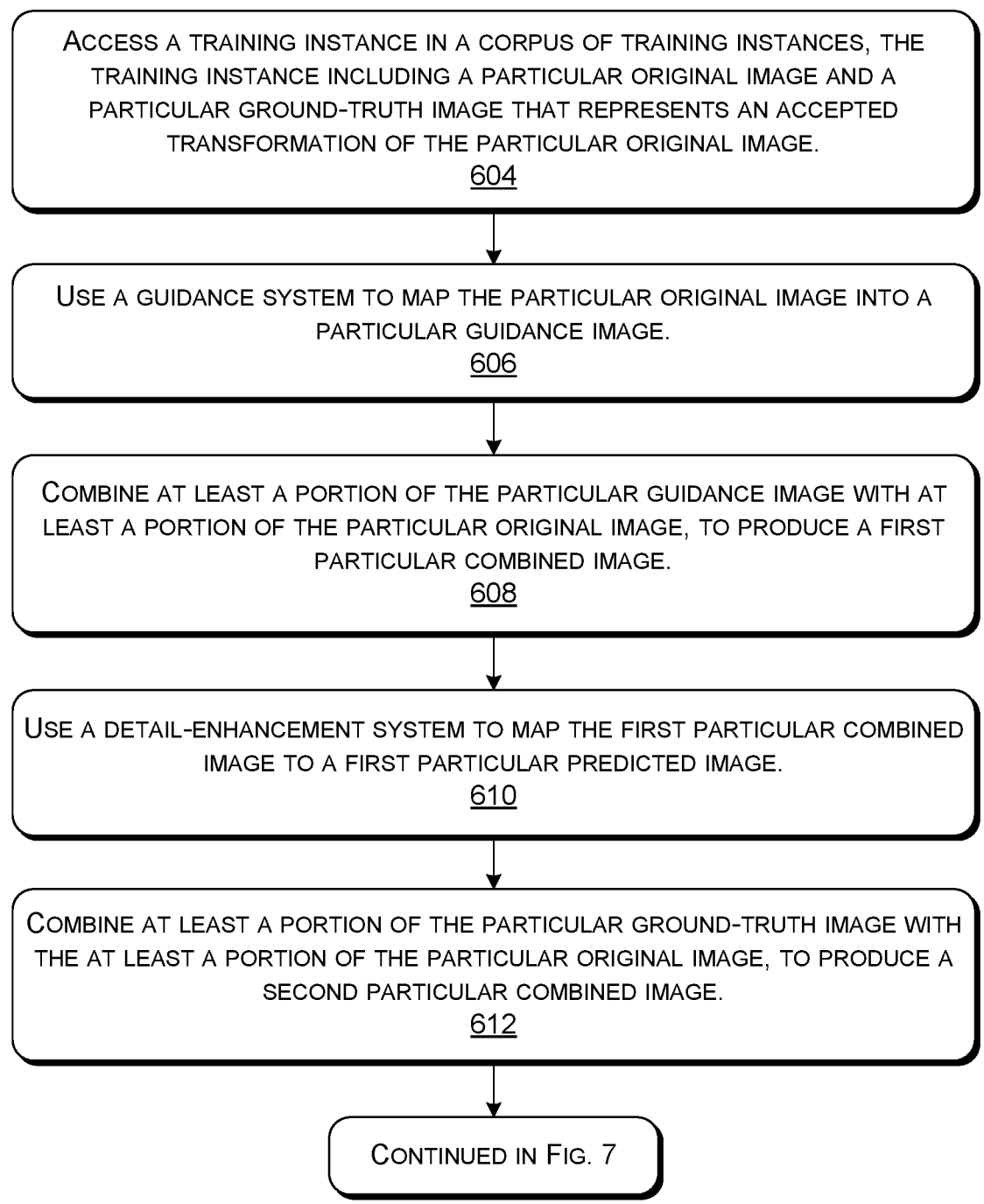
FIGS. 6 and 7 provide a flowchart that shows one illustrative manner of operation of the training system of FIG. 4.
Figure 7:
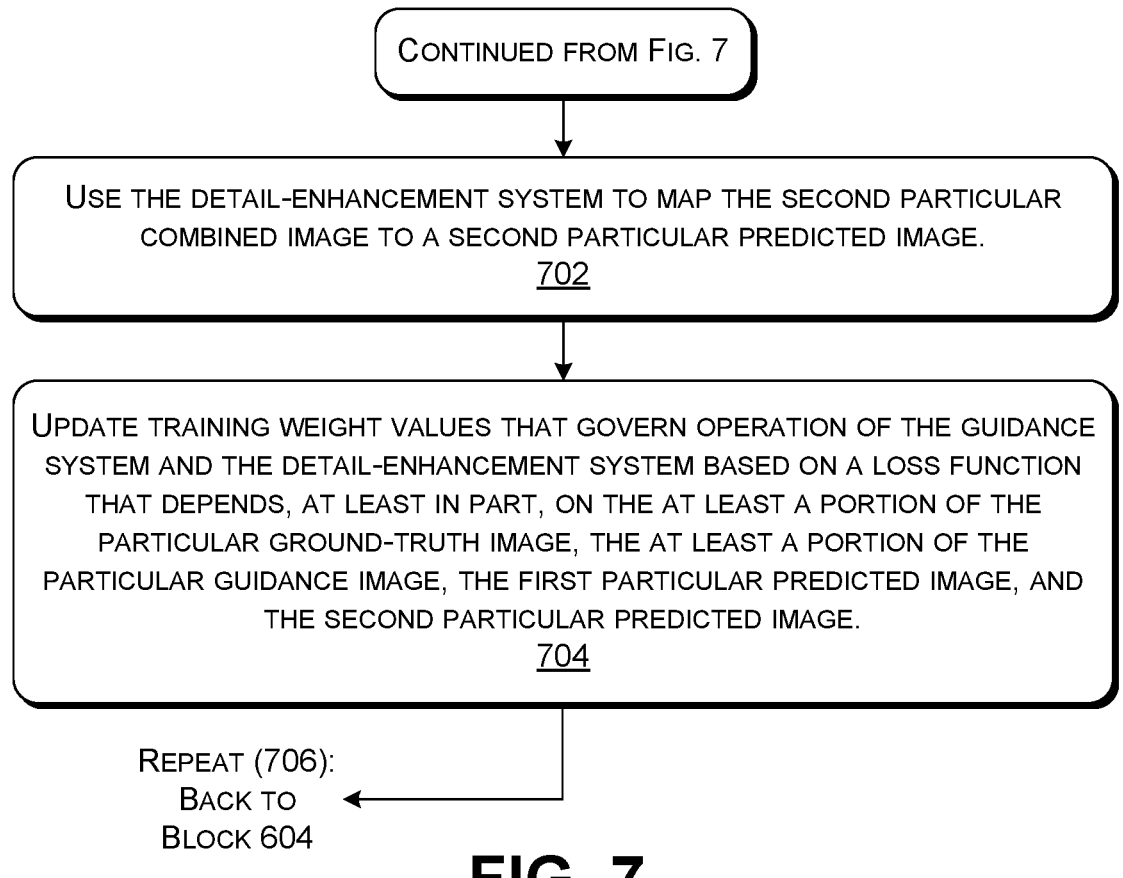

FIGS. 5-7 show processes (502, 602) that explain the operation of the CP system 102 and the training system 402 of Section A in flowchart form. Since the principles underlying the operation of the computing systems have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 5 shows a process 502 that provides an overview of one manner of operation of the CP system 102 of FIG. 1 in the inference stage of processing. In block 504, the CP system 102 uses the guidance system 110 to map an original image 104 provided by an image sensor 108 to a guidance image 116, the guidance image 116 representing a color-corrected and lighting-corrected counterpart of the original image 104. In block 506, the CP system 102 uses the combination unit 118 to combine the original image 104 and the guidance image 116 to produce a combined image 120. In block 508, the CP system 102 uses the detail-enhancement system 112 to map the combined image 120 to a predicted image 122, the predicted image 122 representing a detail-corrected, color-corrected, and lighting-corrected counterpart of the original image 104. The operation of mapping the original image 104 (in block 504) and the operation of mapping the combined image 120 (in block 508) are based on a set of machine-trained weighting values.

FIGS. 6 and 7 together show a process 602 that provides an overview of one manner by which the training system 402 of FIG. 4 trains the CP system 102 using one or more computing devices. In block 604, the training system 402 accesses a training instance 408 in a corpus of training instances, the training instance including a particular original image 410 and a particular ground-truth image 412 that represents an acceptable transformation of the particular original image 410. In block 606, the training system 402 uses the guidance system 110' to map the particular original image 410 into a particular guidance image 416. In block 608, the training system 402 uses the combination unit 418 to combine at least a portion 428 of the particular guidance image 416 with at least a portion 426 of the particular original image 410, to produce a first particular combined image 420. In block 610, the training system 402 uses the detail-enhancement system 112' to map the first particular combined image 420 to a first particular predicted image 422.

In block 612, the training system 402 uses the combination unit 418 to combine at least a portion 430 of the particular ground-truth image 412 with the at least a portion 426 of the particular original image 410, to produce a second particular combined image. In block 702 (of FIG. 7), the training system 402 uses the detail-enhancement system 112' to map the second particular combined image to a second particular predicted image. In block 704, the training system 402 updates training weight values that govern operation of the guidance system 110' and the detail-enhancement system 112' based, at least in part, on a loss function that depends on the at least a portion 430 of the particular ground-truth image 430, the at least a portion 428 of the particular guidance image 416, the first particular predicted image 422, and the second particular predicted image. In operation 706, the training system 402 repeats the above-described process 602 for another training instance, starting with block 604.

Other implementations can vary the training system 402 in different ways. For example, in the implementation described above, the training system 402 performs the entirety of the method 602 for every training instance. But in another case, the training system 402 may perform the entirety of the method 602 only for some training instances. On those iterations that the training system 402 does not perform the full method 602, it can eliminate the operations of blocks 612 and 702 in which a ground-truth image is taken into consideration. For instance, the training system 402 can invoke the full method 602 after a prescribed number of non-alternating training iterations have been performed.

C. Representative Computing Functionality

Figure 8:
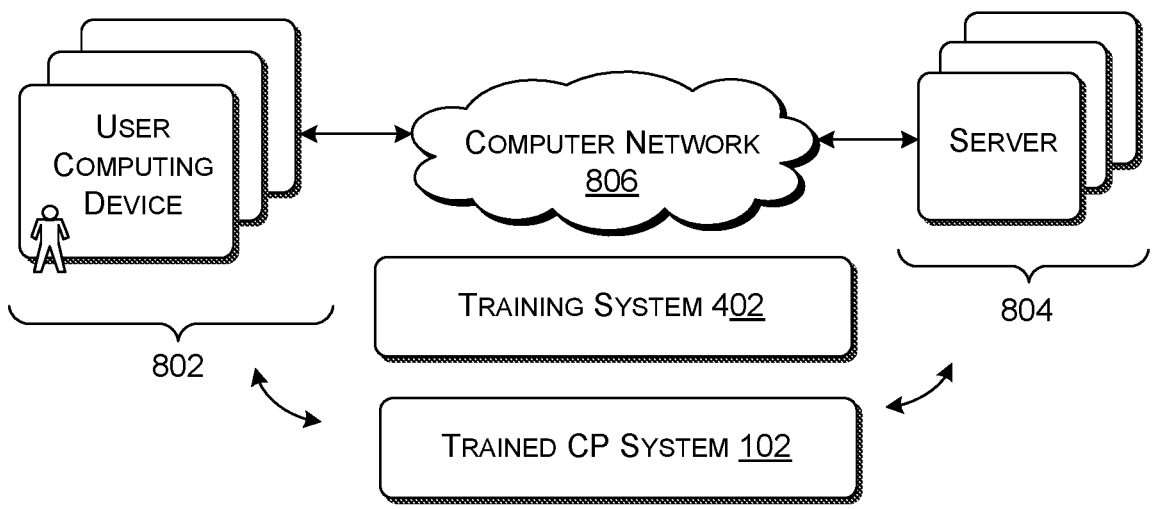
FIG. 8 shows computing equipment that can be used to implement the CP system and training system of FIGS. 1 and 4, respectively.

FIG. 8 shows an example of computing equipment that can be used to implement any of the systems summarized above. The computing equipment includes a set of user computing devices 802 coupled to a set of servers 804 via a computer network 806. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, a camera device of any type, and so on. The computer network 806 can be implemented as a local area network, a wide area network (e.g., the Internet), one or more point-to-point links, or any combination thereof.

FIG. 8 also indicates that the CP system 102 and the training system 402 can be spread across the user computing devices 802 and/or the servers 804 in any manner. For instance, in one case, the CP system 102 is entirely implemented by one or more of the servers 804. In another case, the CP system 102 is entirely implemented by a user computing device in local fashion, in which case no interaction with the servers 804 is necessary. For example, the CP system 102 can be integrated into a local camera device that performs a computing function. In another case, the functionality associated with the CP system 102 is distributed between the servers 804 and each user computing device.

Figure 9:
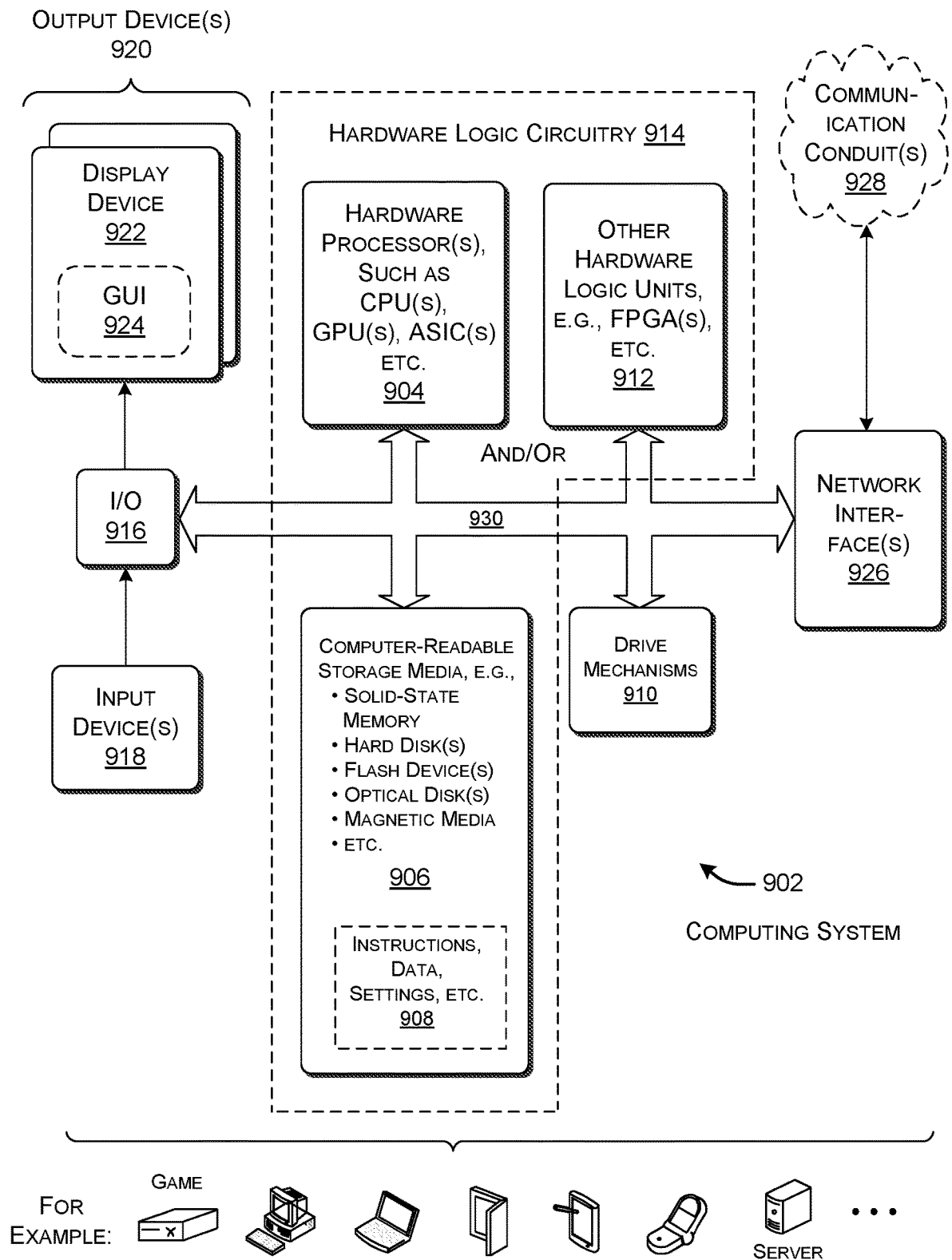
FIG. 9 shows an illustrative type of computing device that can be used to implement any aspect of the features shown in the foregoing drawings.

FIG. 9 shows a computing system 902 that can be used to implement any aspect of the mechanisms set forth in the above-described figures. For instance, the type of computing system 902 shown in FIG. 9 can be used to implement any user computing device or any server shown in FIG. 8. In all cases, the computing system 902 represents a physical and tangible processing mechanism.

The computing system 902 can include one or more hardware processors 904. The hardware processor(s) 904 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing system 902 can also include computer-readable storage media 906, corresponding to one or more computer-readable media hardware units. The computer-readable storage media 906 retains any kind of information 908, such as machine-readable instructions, settings, data, etc. Without limitation, the computer-readable storage media 906 may include one or more solid-state devices, one or more magnetic hard disks, one or more optical disks, magnetic tape, and so on. Any instance of the computer-readable storage media 906 can use any technology for storing and retrieving information. Further, any instance of the computer-readable storage media 906 may represent a fixed or removable unit of the computing system 902. Further, any instance of the computer-readable storage media 906 may provide volatile or non-volatile retention of information.

The computing system 902 can utilize any instance of the computer-readable storage media 906 in different ways. For example, any instance of the computer-readable storage media 906 may represent a hardware memory unit (such as Random Access Memory (RAM)) for storing transient information during execution of a program by the computing system 902, and/or a hardware storage unit (such as a hard disk) for retaining/archiving information on a more permanent basis. In the latter case, the computing system 902 also includes one or more drive mechanisms 910 (such as a hard drive mechanism) for storing and retrieving information from an instance of the computer-readable storage media 906.

The computing system 902 may perform any of the functions described above when the hardware processor(s) 904 carry out computer-readable instructions stored in any instance of the computer-readable storage media 906. For instance, the computing system 902 may carry out computer-readable instructions to perform each block of the processes described in Section B.

Alternatively, or in addition, the computing system 902 may rely on one or more other hardware logic units 912 to perform operations using a task-specific collection of logic gates. For instance, the hardware logic unit(s) 912 may include a fixed configuration of hardware logic gates, e.g., that are created and set at the time of manufacture, and thereafter unalterable. Alternatively, or in addition, the other hardware logic unit(s) 912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 9 generally indicates that hardware logic circuitry 914 includes any combination of the hardware processor(s) 904, the computer-readable storage media 906, and/or the other hardware logic unit(s) 912. That is, the computing system 902 can employ any combination of the hardware processor(s) 904 that execute machine-readable instructions provided in the computer-readable storage media 906, and/or one or more other hardware logic unit(s) 912 that perform operations using a fixed and/or programmable collection of hardware logic gates. More generally stated, the hardware logic circuitry 914 corresponds to one or more hardware logic units of any type(s) that perform operations based on logic stored in and/or otherwise embodied in the hardware logic unit(s).

In some cases (e.g., in the case in which the computing system 902 represents a user computing device), the computing system 902 also includes an input/output interface 916 for receiving various inputs (via input devices 918), and for providing various outputs (via output devices 920). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 922 and an associated graphical user interface presentation (GUI) 924. The display device 922 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 902 can also include one or more network interfaces 926 for exchanging data with other devices via one or more communication conduits 928. One or more communication buses 930 communicatively couple the above-described units together.

The communication conduit(s) 928 can be implemented in any manner, e.g., by a local area computer network, a wide area computer network (e.g., the Internet), point-to-point connections, etc., or any combination thereof. The communication conduit(s) 928 can include any combination of hardwired links, wireless links, routers, gateway functionality, name servers, etc., governed by any protocol or combination of protocols.

FIG. 9 shows the computing system 902 as being composed of a discrete collection of separate units. In some cases, the collection of units may correspond to discrete hardware units provided in a computing device chassis having any form factor. FIG. 9 shows illustrative form factors in its bottom portion. In other cases, the computing system 902 can include a hardware logic unit that integrates the functions of two or more of the units shown in FIG. 1. For instance, the computing system 902 can include a system on a chip (SoC or SOC), corresponding to an integrated circuit that combines the functions of two or more of the units shown in FIG. 9.

The following summary provides a non-exhaustive set of illustrative examples of the technology set forth herein.

According to a first example, a computing system is described for performing computational photography operations. It includes a guidance system, including a first neural network, that is configured to map an original image provided by an image sensor to a guidance image, the guidance image representing a color-corrected and lighting-corrected counterpart of the original image. It also incudes a combination unit configured to combine the original image and the guidance image to produce a combined image. It also includes a detail-enhancement system, including a second neural network, that is configured to map the combined image to a predicted image, the predicted image representing a detail-corrected, color-corrected, and lighting-corrected counterpart of the original image. The guidance system, combination unit, and detail-enhancement system are implemented by hardware logic circuitry provided by the computing system.

According to a second example, the computing system further includes a resizing unit implemented by the hardware logic circuitry configured to resize the original image to a predetermined size prior to operating on the original image using the first neural network.

According to a third example, the first neural network includes plural encoder-decoder neural networks connected in series. Each encoder-decoder neural network includes: an encoder configured to map an encoder input image to an encoder output image; a bottleneck system configured to map the encoder output image to a bottleneck output image; and a decoder configured to map the bottleneck output image to a decoder output image.

According to a fourth example, relating to the third example, each encoder is configured to perform a series of convolution operations, the series of convolution operations producing feature maps of progressively decreasing dimensions.

According to a fifth example, relating to the third example, each decoder is configured to perform a series of convolution operations, the series of convolutional operations producing feature maps of progressively increasing dimensions.

According to a sixth example, relating to the third example, the bottleneck system is configured to: concatenate the encoder output image with a set of property values that pertain to conditions under which the original image was captured by an image capture device, to produce a property-supplemented encoder image; and use a bottleneck neural network to map the property-supplemented encoder image into the bottleneck output image.

According to a seventh example, relating to the third example, the bottleneck system includes plural processing blocks implemented by the hardware logic circuitry, each processing block having one or more processing layers configured to map input data into output data, the input data being added to the output data following the one or more processing layers.

According to an eighth example, the second neural network used by the detail-enhancement system includes plural processing blocks implemented by the hardware logic circuitry, each processing block having one or more processing layers configured to map input data into output data, the input data being added to the output data following the one or more processing layers.

According to a ninth example, the computing system further includes a training system that is implemented by the hardware logic circuitry, the training system being configured to train the first neural network and the second neural network based on a corpus of training instances, each training instance including a particular original image and a particular ground-truth image that represents an accepted transformation of the particular original image.

According to a tenth example, relating to the ninth example, the training system is configured to process each training instance by: using the guidance system to map the particular original image into a particular guidance image; using the combination unit to combine at least a portion of the particular guidance image with at least a portion of the particular original image, to produce a first particular combined image; using the detail-enhancement system to map the first particular combined image to a first particular predicted image; using the combination unit to combine at least a portion of the particular ground-truth image with the at least a portion of the particular original image, to produce a second particular combined image; using the detail-enhancement system to map the second particular combined image to a second particular predicted image; updating training weight values based on a loss function associated with the second neural network that depends at least on the at least a portion of the particular ground-truth image, the at least a portion of the particular guidance image, the first particular predicted image, and the second particular predicted image.

According to an eleventh example, relating to the tenth example, the combination unit is configured to combine the at least a portion of the particular guidance image with the at least a portion of the particular original image by: selecting a guidance image patch from the particular guidance image and an original image patch from the particular original image, the guidance image patch and the original image patch demarcating a same scene content; and resizing the guidance image patch and the original image patch, to produce a resized guidance image path and a resized original image patch, respectively. The combination unit is configured to combine the resized guidance image patch with the resized original image patch, rather than combining an entirety of the particular guidance image with an entirety of the particular original image.

According to a twelfth example, relating to the tenth example, the combination unit is configured to combine the at least a portion of the particular ground-truth image with the at least a portion of the particular original image by: selecting a ground-truth image patch from the particular ground-truth image and an original image patch from the particular original image, the ground-truth image patch and the original image patch demarcating a same scene content; and resizing the ground-truth image patch and the original image patch, to produce a resized ground-truth image patch and a resized original image patch, respectively. The combination unit is configured to combine the resized ground-truth image patch with the resized original image patch, rather than combining an entirety of the particular ground-truth image with an entirety of the particular original image.

According to a thirteenth example, a method for training a computational photography system using one or more computing devices is described. The method includes: accessing a training instance in a corpus of training instances, the training instance including a particular original image and a particular ground-truth image that represents an accepted transformation of the particular original image; using a guidance system to map the particular original image into a particular guidance image; combining at least a portion of the particular guidance image with at least a portion of the particular original image, to produce a first particular combined image; using a detail-enhancement system to map the first particular combined image to a first particular predicted image; combining at least a portion of the particular ground-truth image with the at least a portion of the particular original image, to produce a second particular combined image; using the detail-enhancement system to map the second particular combined image to a second particular predicted image; updating training weight values that govern operation of the guidance system and the detail-enhancement system based on a loss function that depends at least on the at least a portion of the particular ground-truth image, the at least a portion of the particular guidance image, the first particular predicted image, and the second particular predicted image; and repeating the method from the accessing to the updating for another training instance.

According to a fourteenth example, relating to the thirteenth example, the method combines the at least a portion of the particular guidance image with the at least a portion of the particular original image by: selecting a guidance image patch from the particular guidance image and an original image patch from the particular original image, the guidance image patch and the original image patch demarcating a same scene content; and resizing the guidance image patch and the original image patch, to produce a resized guidance image patch and a resized original image patch, respectively. The method combines the resized guidance image patch with the resized original image patch, rather than combining an entirety of the particular guidance image with an entirety of the particular original image.

According to a fifteenth example, relating to the thirteenth example, the method combines the at least a portion of the particular ground-truth image with the at least a portion of the particular original image by: selecting a ground-truth image patch from the particular ground-truth image and an original image patch from the particular original image, the ground-truth image patch and the original image patch demarcating a same scene content; and resizing the ground-truth image patch and the original image patch, to produce a resized ground-truth image patch and a resized original image patch. The method combines the resized ground-truth image patch with the resized original image patch, rather than combining an entirety of the particular ground-truth image with an entirety of the particular original image.

According to a sixteenth example, relating to the thirteenth example, the guidance system uses a neural network that includes plural encoder-decoder neural networks connected in series, each encoder-decoder neural network including: an encoder configured to map an encoder input image to an encoder output image; a bottleneck system configured to map the encoder output image to a bottleneck output image; and a decoder configured to map the bottleneck output image to a decoder output image.

According to a seventeenth example, relating to the thirteenth example, the detail-enhancement system uses a neural network that includes plural processing blocks, each processing block having one or more processing layers that map input data into output data, the input data being added to the output data following the one or more processing layers.

According to an eighteenth example, a computer-readable storage medium for storing computer-readable instructions is described. The computer-readable instructions, when executed by one or more hardware processors, perform a method that includes: mapping an original image provided by an image sensor to a guidance image, the guidance image representing a color-corrected and lighting-corrected counterpart of the original image; combining the original image and the guidance image to produce a combined image; and mapping the combined image to a predicted image, the predicted image representing a detail-corrected, color-corrected, and lighting-corrected counterpart of the original image. The mapping of the original image and the mapping of the combined image are based on a set of machine-trained weighting values.

According to a nineteenth example, relating to the eighteenth example, the mapping the original image includes mapping the original image to the guidance image in a pipeline of stages, each stage involving: encoding an encoder input image to an encoder output image; mapping the encoder output image to a bottleneck output image; and decoding the bottleneck output image to a decoder output image.

According to a twentieth example, relating to the eighteenth example, the mapping of the combined image includes processing the combined image in a succession of processing blocks, each processing block including a residual connection.

A twenty-first aspect corresponds to any combination (e.g., any logically consistent permutation or subset) of the above-referenced first through twentieth examples.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for performing computational photography operations, comprising:
   a guidance system, including a first neural network, configured to map an original image provided by an image sensor to a guidance image, the guidance image representing a color-corrected and lighting-corrected counterpart of the original image;
   a combination unit configured to combine the original image and the guidance image to produce a combined image; and
   a detail-enhancement system, including a second neural network, configured to map the combined image to a predicted image, the predicted image representing a detail-corrected, color-corrected, and lighting-corrected counterpart of the original image,
   the guidance system, combination unit, and detail-enhancement system being implemented by hardware logic circuitry provided by the computing system,
   wherein the first neural network and the second neural network include weight values that are produced using a loss function that includes a first loss component and a second loss component, the first loss component expressing a first loss that depends on guidance images produced by the first neural network for respective original images, and the second loss component expressing a second loss that depends on ground-truth images that represent accepted transformations of the respective original images.

2. The computing system of claim 1, further including a first resizing unit implemented by the hardware logic circuitry configured to reduce a size of the original image prior to operating on the original image using the first neural network, and a second resizing unit implemented by the hardware logic circuitry configured to increase the size of the guidance image to the size of the original image prior to operation of the second neural network.

3. The computing system of claim 1, wherein the first neural network includes plural encoder-decoder neural networks connected in series, each encoder-decoder neural network including:
an encoder configured to map an encoder input image to an encoder output image;
a bottleneck system configured to map the encoder output image to a bottleneck output image; and
a decoder configured to map the bottleneck output image to a particular decoder output image.

4. The computing system of claim 3, wherein each encoder is configured to perform a series of convolution operations, the series of convolution operations producing feature maps of progressively decreasing dimensions.

5. The computing system of claim 3, wherein each decoder is configured to perform a series of convolution operations, the series of convolutional operations producing feature maps of progressively increasing dimensions.

6. The computing system of claim 1, wherein the second neural network used by the detail-enhancement system includes plural processing blocks implemented by the hardware logic circuitry, each processing block having one or more processing layers configured to map input data into output data, the input data being added to the output data following said one or more processing layers.

7. A computing system for performing computational photography operations, comprising:
a guidance system, including a first neural network, configured to map an original image provided by an image sensor to a guidance image, the guidance image representing a color-corrected and lighting-corrected counterpart of the original image;
a combination unit configured to combine the original image and the guidance image to produce a combined image; and
a detail-enhancement system, including a second neural network, configured to map the combined image to a predicted image, the predicted image representing a detail-corrected, color-corrected, and lighting-corrected counterpart of the original image,
the guidance system, combination unit, and detail-enhancement system being implemented by hardware logic circuitry provided by the computing system,
wherein the first neural network includes plural encoder-decoder neural networks connected in series, each encoder-decoder neural network including:
an encoder configured to map an encoder input image to an encoder output image;
a bottleneck system configured to map the encoder output image to a bottleneck output image; and
a decoder configured to map the bottleneck output image to a decoder output image,
wherein the bottleneck system is configured to:
concatenate the encoder output image with a set of property values that pertain to conditions under which the original image was captured by an image capture device, to produce a property-supplemented encoder image; and
use a bottleneck neural network to map the property-supplemented encoder image into the bottleneck output image.

8. A computing system for performing computational photography operations, comprising:
a guidance system, including a first neural network, configured to map an original image provided by an image sensor to a guidance image, the guidance image representing a color-corrected and lighting-corrected counterpart of the original image;
a combination unit configured to combine the original image and the guidance image to produce a combined image; and
a detail-enhancement system, including a second neural network, configured to map the combined image to a predicted image, the predicted image representing a detail-corrected, color-corrected, and lighting-corrected counterpart of the original image,
the guidance system, combination unit, and detail-enhancement system being implemented by hardware logic circuitry provided by the computing system,
wherein the first neural network includes plural encoder-decoder neural networks connected in series, each encoder-decoder neural network including:
an encoder configured to map an encoder input image to an encoder output image;
a bottleneck system configured to map the encoder output image to a bottleneck output image; and
a decoder configured to map the bottleneck output image to a decoder output image,
wherein the bottleneck system includes plural processing blocks implemented by the hardware logic circuitry, each processing block having one or more processing layers configured to map input data into output data, the input data being added to the output data following said one or more processing layers.

9. A method for training a computational photography system using one or more computing devices, comprising:
accessing a training instance in a corpus of training instances, the training instance including a particular original image and a particular ground-truth image that represents an accepted transformation of the particular original image;
using a guidance system to map the particular original image into a particular guidance image;
combining at least a portion of the particular guidance image with at least a portion of the particular original image, to produce a first particular combined image;
using a detail-enhancement system to map the first particular combined image to a first particular predicted image;
combining at least a portion of the particular ground-truth image with said at least a portion of the particular original image, to produce a second particular combined image;
using the detail-enhancement system to map the second particular combined image to a second particular predicted image;
updating training weight values that govern operation of the guidance system and the detail-enhancement system based on a loss function that depends at least on said at least a portion of the particular ground-truth image, said at least a portion of the particular guidance image, the first particular predicted image, and the second particular predicted image; and repeating the method from said accessing to said updating for another training instance.

10. The method of claim 9, wherein the method combines said at least a portion of the particular guidance image with said at least a portion of the particular original image by:
selecting a guidance image patch from the particular guidance image and an original image patch from the particular original image, the guidance image patch and the original image patch demarcating a same scene content; and
resizing the guidance image patch and the original image patch, to produce a resized guidance image patch and a resized original image patch, respectively,
wherein the method combines the resized guidance image patch with the resized original image patch, rather than combining an entirety of the particular guidance image with an entirety of the particular original image.

11. The method of claim 9, wherein the method combines said at least a portion of the particular ground-truth image with said at least a portion of the particular original image by:
selecting a ground-truth image patch from the particular ground-truth image and an original image patch from the particular original image, the ground-truth image patch and the original image patch demarcating a same scene content; and
resizing the ground-truth image patch and the original image patch, to produce a resized ground-truth image patch and a resized original image patch,
wherein the method combines the resized ground-truth image patch with the resized original image patch, rather than combining an entirety of the particular ground-truth image with an entirety of the particular original image.

12. The method of claim 9, wherein the guidance system uses a neural network that includes plural encoder-decoder neural networks connected in series, each encoder-decoder neural network including:
an encoder configured to map an encoder input image to an encoder output image;
a bottleneck system configured to map the encoder output image to a bottleneck output image; and
a decoder configured to map the bottleneck output image to a decoder output image.

13. The method of claim 9, wherein the detail-enhancement system uses a neural network that includes plural processing blocks, each processing block having one or more processing layers that map input data into output data, the input data being added to the output data following said one or more processing layers.

14. A computer-readable storage medium for storing computer-readable instructions, the computer-readable instructions, when executed by one or more hardware processors, performing a method that comprises:
mapping an original image provided by an image sensor to a guidance image, the guidance image representing a color-corrected and lighting-corrected counterpart of the original image;
combining the original image and the guidance image to produce a combined image; and
mapping the combined image to a predicted image, the predicted image representing a detail-corrected, color-corrected, and lighting-corrected counterpart of the original image,
said mapping the original image and said mapping the combined image being based on a set of machine-trained weight values,
the machine-trained weight values being produced based on a corpus of training instances, each training instance including a particular original image and a particular ground-truth image that represents an accepted transformation of the particular original image,
the training involving processing each training instance by:
mapping the particular original image into a particular guidance image;
combining at least a portion of the particular guidance image with at least a portion of the particular original image, to produce a first particular combined image;
mapping the first particular combined image to a first particular predicted image;
combining at least a portion of the particular ground-truth image with said at least a portion of the particular original image, to produce a second particular combined image;
mapping the second particular combined image to a second particular predicted image; and
updating the training weight values based on a loss function that depends at least on said at least a portion of the particular ground-truth image, said at least a portion of the particular guidance image, the first particular predicted image, and the second particular predicted image.

15. The computer-readable storage medium of claim 14, wherein the computer-readable instructions are configured to combine said at least a portion of the particular guidance image with said at least a portion of the particular original image by:
selecting a guidance image patch from the particular guidance image and an original image patch from the particular original image, the guidance image patch and the original image patch demarcating a same scene content; and
resizing the guidance image patch and the original image patch, to produce a resized guidance image patch and a resized original image patch, respectively,
wherein the computer-readable instructions are configured to combine the resized guidance image patch with the resized original image patch, rather than combining an entirety of the particular guidance image with an entirety of the particular original image.

16. The computer-readable storage medium of claim 14, wherein the computer-readable instructions are configured to combine said at least a portion of the particular ground-truth image with said at least a portion of the particular original image by:
selecting a ground-truth image patch from the particular ground-truth image and an original image patch from the particular original image, the ground-truth image patch and the original image patch demarcating a same scene content; and
resizing the ground-truth image patch and the original image patch, to produce a resized ground-truth image patch and a resized original image patch, respectively,
wherein the computer-readable instructions are configured to combine the resized ground-truth image patch with the resized original image patch, rather than combining an entirety of the particular ground-truth image with an entirety of the particular original image.

17. The computer-readable storage medium of claim 14, wherein said mapping the original image includes mapping the original image to the guidance image in a pipeline of stages, each stage involving:
   encoding an encoder input image to an encoder output image;
   mapping the encoder output image to a bottleneck output image; and
   decoding the bottleneck output image to a decoder output image.

18. The computer-readable storage medium of claim 14, wherein said mapping the combined image includes processing the combined image in a succession of processing blocks, each processing block including a residual connection.

* * * * *